United States Patent Office 2,945,936
Patented July 19, 1960

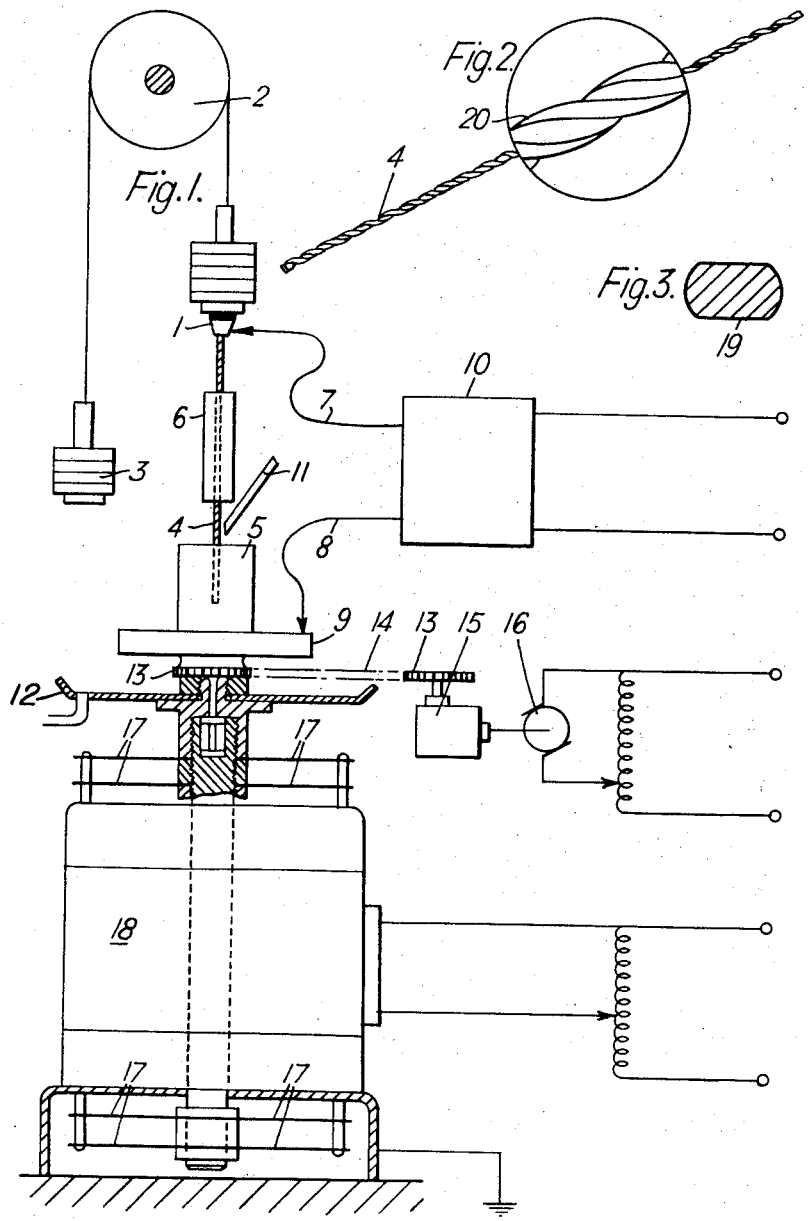

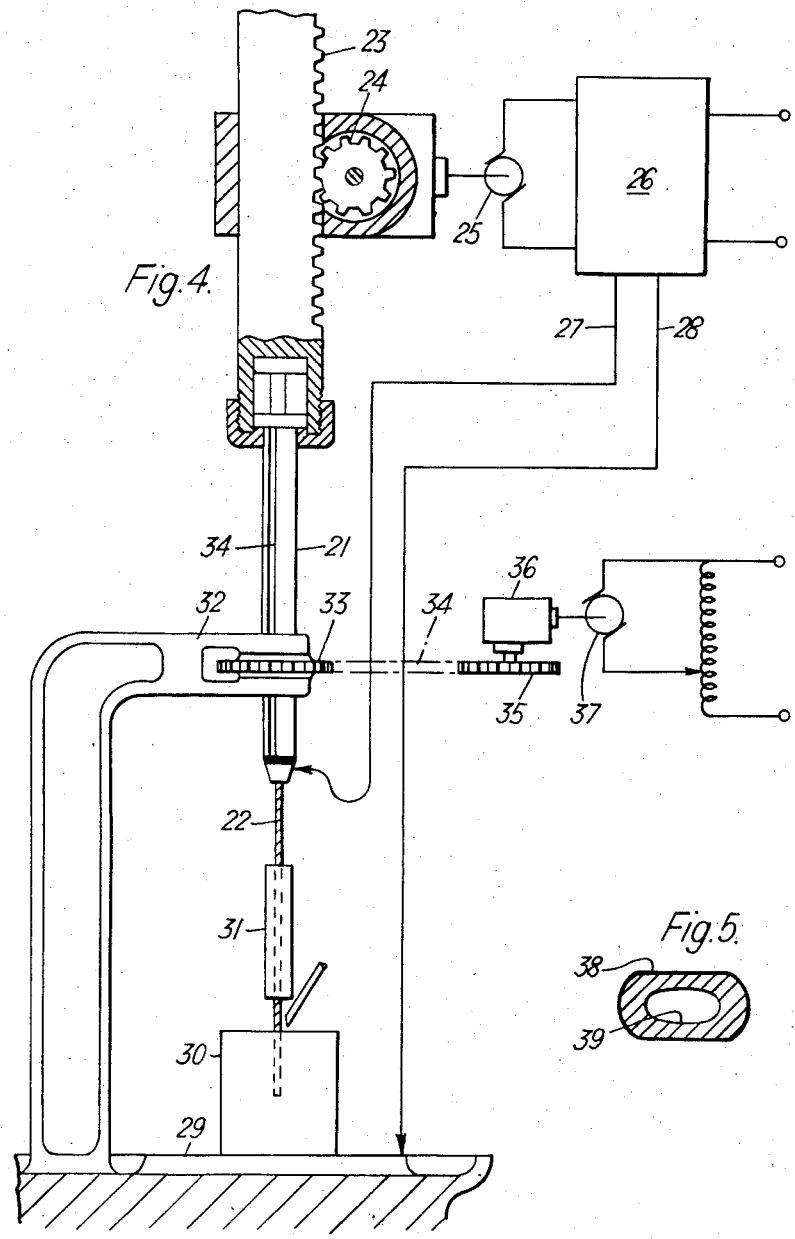

2,945,936

SPARK-MACHINING

Eric Hewstone Carman, Birmingham, England, assignor to The Birmingham Small Arms Company Limited, Birmingham, England Filed Mar. 1, 1957, Ser. No. 643,384

Claims priority, application Great Britain Mar. 2, 1956

3 Claims. (Cl. 219—69)

This invention relates to spark-machining and is particularly concerned with the drilling of deep cylindrical holes by this method.

An object of the invention is to facilitate the removal of the debris produced by the spark action; another object is to increase the rate of drilling; yet another object is to control the size and straightness of the hole to within fine limits; and a still further object is to improve the degree of surface finish in the hole.

Although an electrode forms a hole of diameter slightly greater than its own, because the sparking at the end face of the electrode is not entirely confined to the area of that face, there is but little clearance for the necessary flow of dielectric to the cutting face and for the removal of debris. If anything, the difficulty appears the greater the finer the hole to be cut; at any rate it adds to the general difficulty of producing straight holes, and particularly deep holes, of small diameter.

According to the present invention, a process of spark-machining comprises applying to a workpiece the end of an electrode of helical form, effecting sparking between the end of the electrode and the workpiece, supplying a flow of dielectric fluid to the sparking position, effecting relative rotation between the electrode and the workpiece in a direction corresponding to the hand of the helix, and maintaining a rate of feed to keep the end of the electrode in sparking position at the end of the hole produced by the electrode.

As with a twist drill or an Archimedean screw, the helical electrode causes debris to be screwed out of the hole, notwithstanding the flow of dielectric liquid round the electrode to the cutting face at the end of the electrode. The removal of debris along the side of the electrode frees the cutting face of debris and permits faster cutting to be obtained.

Moreover, probably because the side-sparking that takes place at the end of the electrode is distributed round the periphery of the hole being drilled, the surface of the hole is much less irregular than that of a hole drilled by an electrode that merely plunges into the workpiece and the surface is much cleaner and more nearly truly cylindrical.

A further result of the invention is that a deep hole is not only drilled very straight, but has very little tendency to deviate from a predetermined line of drilling. Thus, a hole 5" or 6" deep may be drilled with a deviation as small as 0.002".

A suitable rate of relative rotation is 100 to 150 r.p.m., but this indication is not to be taken as limitative, since the speed can be adjusted according to conditions, particularly the nature of the material to be drilled and the diameter of the hole. In general, the finer the hole, the greater the rate of rotation.

The relative rotation between the electrode and the workpiece may be effected by rotating either one of these elements, or by rotating both of them.

The electrode may be formed from round wire of smaller diameter than that of the hole to be drilled, which wire is formed into a quick-pitch helix, of overall diameter with respect to the axis of the helix corresponding to that of the hole to be drilled. Thus, the wire may be close-coiled about a small diameter mandril and then removed and extended until the required overall diameter is reached.

Again, wire of non-circular section, e.g., oval, square, or polygonal, may be twisted to a helix of the required pitch, and of the required overall diameter. Thus, round wire may be rolled to flatten it somewhat, and then twisted.

The helical electrode may also be hollow, to assist in the supply of dielectric fluid to the cutting face. Thus, a tube may be flattened, and then twisted into helical form.

To discourage side-sparking between the side of the part of the hole already drilled and the peripheral portions of the helical electrode that are necessarily nearer the sides of the hole, the electrode may have an insulating coating. Thus, copper wire, which is particularly suited for the relatively fast cutting of nickel-base heat-resisting alloys, may be enamel coated. Again, a coating of softer plastic insulating material may be used. The wire may be coated before its formation into a helix, provided the coating is not disrupted by the twisting, or afterwards.

Plastic-insulated wire is particularly suitable for rolling to flat section and subsequent twisting. With the use of helical electrodes of this type, holes 5" or 6" long and 0.120" or 0.130" in diameter have been drilled in nickel-base heat-resisting alloy in approximately one-half of the time taken with electrodes used in the normal way, i.e., without any relative rotation between them and the workpieces.

The invention thus provides a most substantial advance in the speed of drilling and in the accuracy as to the size, straightness, and alignment, of holes in hard materials where the combination of hole-length and hole-diameter makes it impracticable to use twist drills.

The invention will now be further described with reference to the accompanying drawings, in which:

Figure 1 is a part-sectional diagrammatic elevation of a machine with provision for rotating the workpiece relatively to a non-rotating electrode;

Figure 2 is a perspective view of a helical electrode, with part shown magnified;

Figure 3 is an enlarged section of wire suitable for twisting into a helical electrode;

Figure 4 is a part-sectional diagrammatic elevation of another machine, with provision for rotating the electrode relative to a stationary workpiece; and Figure 5 is an enlarged section of tube also suitable for twisting to form a hollow helical electrode.

In Figure 1, an electrode holder 1 is supported from a pulley 2 and counterpoised by a weight 3, such that a vertical helical electrode 4 carried by the holder 1 always has a downward urge towards a workpiece 5, to which it is directed by a guide 6, through which it slides freely. Sparking is effected between the end of the electrode and the workpiece by current supplied through leads 7, 8 to the holder 1 and a work table 9 in electrical contact with the workpiece. The spark control mechanism is indicated at 10. Dielectric fluid fed to the workpiece from a spout 11 is collected in a tray 12 below the table 9.

The table 9 is driven by sprockets 13 and a chain 14 from a gear-box 15 driven by a variable speed motor 16. The tray 12 supports the table 9 and is itself supported by springs 17 from a variable speed vibrator 18 which vibrates the workpiece vertically. The rate of rotation of the table 9, the rate of vertical vibration of the table, and the sparking can all be adjusted in accordance with the requirements of the material of the workpiece 5 and the diameter of the hole to be drilled.

The overall diameter of the helical electrode 4 (slightly less than that of the desired hole, because of clearance produced by side sparking at the cutting end) calls for appropriate section of the initial wire. Figure 3 shows a suitable section of flattened wire, say of copper, produced by rolling a round wire already coated with insulating plastic 19. Upon twisting, the wire assumes the helical form seen more clearly in the enlarged portion 20 of Figure 2. In Figure 2, the helix is right-handed, so that the rotation of the table 9 is in a direction tending to "screw" the electrode deeper into the hole in the workpiece 5; although, of course, the actual cutting action of the end of the soft electrode is purely a result of the applied sparking, and not a mechanical effect of the twisted form of the electrode.

In Figure 4, a holder 21 for a helical electrode 22 is movable vertically by a rack 23 and a pinion 24, the latter being driven in one direction or another by a servomotor 25 from an automatic controller 26 supplying sparking current by leads 27, 28 to the holder 21 and a work table 29 in electrical contact with a workpiece 30, and responsive to the gap conditions between the end of electrode 22 and the end of the hole in the workpiece to maintain the gap as drilling proceeds and as the electrode is consumed. The electrode is directed towards the workpiece by the guide 31.

The holder 21 is rotatably supported by the rack 23 and in a bracket 32. The bracket 32 carries a sprocket 33, slidably engaging a keyway 34 in the holder 21, so that the holder can be rotated at all positions to which it is brought by the pinion 24. The sprocket 33 is driven by a chain 34 from a sprocket 35 on a gear-box 36 driven by a variable speed motor 37.

Figure 5 shows a suitable section of flattened tube, say of copper produced by rolling a tube already coated with insulating plastic 38. The flattened tube is twisted to assume a helical form similar in appearance to that of Figure 2, the inside 39 of the tube providing a duct for the supply of dielectric fluid to the sparking face of the electrode, leaving the clearance between the electrode and the hole being drilled free for the return of the dielectric fluid carrying away the debris from the sparking face.

What I claim is:

1. A method of spark machining for producing a deep cylindrical plain hole in a workpiece comprising applying to the workpiece the end of an elecrode having integrally formed spiral flutes, effecting sparking between the end of the electrode and the workpiece, supplying a flow of dielectric fluid to the sparking position, rotating the electrode and workpiece continuously in a direction corresponding to the hand of the spiral flutes, and maintaining a rate of feed to keep the end of the electrode in sparking position at the end of the hole produced by the electrode.

2. A method of spark machining for producing a deep cylindrical plain hole in a workpiece, comprising applying to the workpiece the end of an electrode having integrally formed spiral flutes, effecting sparking between the end of the electrode and the workpiece, supplying a flow of dielectric fluid to the sparking position, rotating the electrode and workpiece continuously in a direction corresponding to the hand of the spiral flutes, vibrating the workpiece vertically, and maintaining a rate of feed to keep the end of the electrode in sparking position at the end of the hole produced by the electrode.

3. A method of spark machining for producing a deep cylindrical plain hole in a workpiece, comprising applying to the workpiece the end of a hollow electrode having integrally formed external spiral flutes, effecting sparking between the end of the electrode and the workpiece, supplying a flow of dielectric fluid to the sparking position through the hollow electrode, rotating the electrode and workpiece continuously in a direction corresponding to the hand of the spiral flutes, and maintaining a rate of feed to keep the end of the electrode in sparking position at the end of the hole produced by the electrode.

References Cited in the file of this patent

UNITED STATES PATENTS

| | | |
|---|---|---|
| 650,124 | Coleman | May 22, 1900 |
| 1,492,167 | Granger | Apr. 29, 1924 |
| 2,490,302 | Holfelder | Dec. 6, 1949 |
| 2,592,894 | Harding | Apr. 15, 1952 |
| 2,640,136 | Ronay | May 26, 1953 |
| 2,650,979 | Teubner | Sept. 1, 1953 |
| 2,715,172 | Larkins | Aug. 9, 1955 |
| 2,773,968 | Martellotti | Dec. 11, 1956 |

FOREIGN PATENTS

| | | |
|---|---|---|
| 279,886 | Great Britain | Dec. 8, 1927 |
| 319,487 | Great Britain | Sept. 26, 1929 |